United States Patent
Menon et al.

(10) Patent No.: US 7,269,707 B2
(45) Date of Patent: Sep. 11, 2007

(54) MULTIPLE PATCHES TO ON-CHIP ROM IN A PROCESSOR WITH A MULTILEVEL MEMORY SYSTEM WITHOUT AFFECTING PERFORMANCE

(75) Inventors: Amitabh Menon, Stafford, TX (US); Subash Chandar Govindarajan, Tamil Nadu (IN); Venkatesh Natarajan, Karnataka (IN); Vijay Sindagi, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 301 days.

(21) Appl. No.: 10/754,252

(22) Filed: Jan. 9, 2004

(65) Prior Publication Data

US 2004/0163080 A1   Aug. 19, 2004

Related U.S. Application Data

(60) Provisional application No. 60/439,270, filed on Jan. 10, 2003.

(51) Int. Cl.
*G06F 12/08* (2006.01)

(52) U.S. Cl. ........................ 711/202; 711/102; 711/118; 711/122; 717/168

(58) Field of Classification Search ................ None
See application file for complete search history.

(56) References Cited

U.S. PATENT DOCUMENTS 5,829,012 A * 10/1998 Marlan et al. .............. 711/102
6,128,751 A * 10/2000 Yamamoto et al. ............ 714/8

OTHER PUBLICATIONS

Handy, Jim. "The Cache Memory Book, Second Edition", Academic Press, Inc. © 1998, pp. 12 & 89-97.*

* cited by examiner

*Primary Examiner*—Gary Portka
(74) *Attorney, Agent, or Firm*—Robert D. Marshall, Jr.; W. James Brady; Frederick J. Telecky, Jr.

(57) ABSTRACT

A programmable address decoder is common to the on-chip ROM and on-chip RAM. The programmable address decoder conditionally routes accesses to portions of the ROM to the RAM. The ROM address space is mapped to RAM via a set of configuration registers. This permits patched ROM program code and data table to be stored in on-chip RAM. The patched code and configuration data is stored in an off-chip non-volatile memory. This patch code and the configuration to use is loaded into the RAM and configuration registers on system bootstrap procedure.

9 Claims, 3 Drawing Sheets

(1) L1I CACHE MISS FILL FROM L2
(2) L1D CACHE MISS FILL FROM L2
(3) L1D WRITE MISS TO L2, OR L1D VICTIM TO L2, OR L1D SNOOP RESPONSE TO L2
(4) L2 CACHE MISS FILL, OR DMA INTO L2
(5) L2 VICTIM WRITE BACK, OR DMA OUT OF L2
(6) DMA INTO L2
(7) DMA OUT OF L2

MULTIPLE PATCHES TO ON-CHIP ROM IN A PROCESSOR WITH A MULTILEVEL MEMORY SYSTEM WITHOUT AFFECTING PERFORMANCE

CLAIM OF PRIORITY

This application claims priority under 35 U.S.C. 119 (e)(1) from U.S. Provisional Application No. 60/439,270 filed Jan. 10, 2003.

TECHNICAL FIELD OF THE INVENTION

The technical field of this invention is change of programming in read only memory programmed systems.

BACKGROUND OF THE INVENTION

In an embedded processor based system, it is common to store data and program code in an on-chip read only memory (ROM). Such on-chip ROM has a low area and is non-volatile. Making any modifications in the ROM contents requires the chip to be re-manufactured. For some program changes, such as functional enhancements, chips with new ROMs can be used in a next generation product. For critical functional failures, the system must be recalled from the customer and the new chips substituted for the prior chips. This can be very expensive.

Previous solutions to this problem include: U.S. Pat. No. 4,028,678, U.S. Pat. No. 4,028,679, U.S. Pat. No. 4,028,683, U.S. Pat. No. 4,028,684, U.S. Pat. No. 4,400,798, U.S. Pat. No. 4,542,453, U.S. Pat. No. 4,610,000 and the paper "Patchable Instruction ROM Architecture" by Sherwood and Calder, in the conference CASES '01, Nov. 16-17, 2001, Atlanta, Ga., USA.

All of these prior solutions patch ROM contents on a location by location basis. This is useful for defect masking in ROM designs as in the first few patents, or in microcode patches as in some of the other patents. However, application code patches are typically larger in size than enabled by these techniques. Location wise patching is not effective in such cases. The best one can do is use the patch to branch to patch code elsewhere in the system. This both increases access latency and reduces performance. Most of these prior solutions rely on either chip pin level controls or associative look-up tables to detect the access to be patched. These techniques are either expensive solutions that negatively impact access time or compatibility. Pin based controls are particularly bad for compatibility. None of these prior solutions deal with multi-level memory systems.

SUMMARY OF THE INVENTION

This invention creates a programmable address decoder common to the on-chip ROM and on-chip RAM. The programmable address decoder conditionally routes accesses to portions of the ROM to the RAM. The ROM address space is divided into equal length sectors which are mapped to the same sized sectors in the RAM via a set of configuration registers. This invention does not change the access time to locations in such a sector. The patched code and configuration can be stored on an off-chip non-volatile memory. This patch code and the configuration to use it can be loaded into the RAM and configuration registers during the system bootstrap procedure. The size of this patched code can be extended effectively by using the limited patch sector size to insert calls to procedures in higher levels of the memory system at the expense of latency.

For small changes, this invention allows the contents to be substituted with the desired changed content stored in other memory, such as volatile on-chip or non-volatile off-chip memory. This solves a common problem of patching ROM contents in such systems after manufacture, without impacting the performance of the system.

This invention enables multiple ROM patches to be applied in a multi-level memory system. Each ROM patch is applied for a block of consecutive locations of the ROM. The block size can be fixed or programmable in alternative implementation. This invention is thus suitable for patching application code and data tables. In each case the access time is not impacted by hiding the latency of accesses from the central processing unit in the multilevel memory system. In addition, this solution can also be to improve yield by patching defective ROM locations.

BRIEF DESCRIPTION OF THE DRAWINGS

These and other aspects of this invention are illustrated in the drawings, in which.

DETAILED DESCRIPTION OF PREFERRED EMBODIMENTS

Embedded processor based systems usually contain some amount of on-chip memory to store program and data for the processor to work on. If there is program and data that is fixed for the device and need not be modified in operation, Read Only Memory (ROM) is used for that on such systems to reduce the chip area and hence cost. The problem with using ROMs is that once the chip is fabricated, the contents of the ROM are fixed. If there is a problem or bug in the programmed contents, the part must be re-manufactured to fix the problem. Often when code is stored on the ROM, patching the code for fixing bugs becomes an expensive process. This invention makes patches to the ROM content at runtime using internal RAM memory, thereby saving the expense of re-manufacture.

This invention provides the ROM patching capability by routing the accesses meant for the buggy ROM region to the patch content in RAM. For this, the memory address decoder is programmable via configuration registers that decide the regions in the ROM and RAM to be used for the patching. The configuration registers specify blocks or sectors in the ROM that need to be replaced in the memory map with corresponding sectors in the RAM. This configuration can be done at boot time as part of the bootstrap routine along with the download of the patch code. When the patch code is the same size as the buggy code, this remapping is transparent and does not affect the latency of operation of the code. Thus the patch is cycle compatible with the buggy code. If the patched code is larger than the buggy code, the patch can be extended by chaining the code to extended patch code in higher levels of memory such as external DRAM, EPROM or Flash memory.

Figure 1:
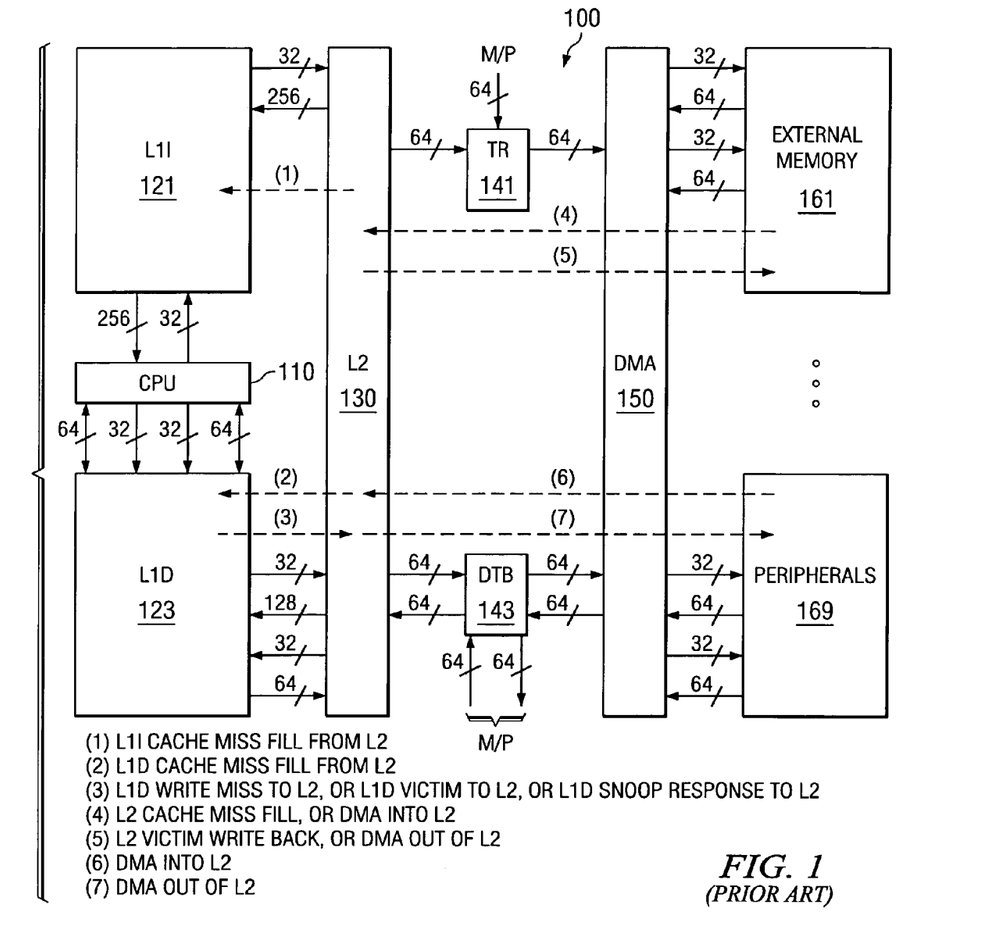
FIG. 1 illustrates the organization of a typical digital signal processor to which this invention is applicable.

FIG. 1. illustrates the organization of a typical digital signal processor system 100 to which this invention is applicable. Digital signal processor system 100 includes central processing unit core 110. Central processing unit core 110 includes the data processing portion of digital signal processor system 100. Central processing unit core 110 could be constructed as known in the art and would typically include a register file, an integer arithmetic logic unit, an integer multiplier and program flow control units.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

In accordance with the preferred embodiment of this invention, level two unified cache 130 may be configured to include variable amounts of static random access memory (SRAM) instead of cache memory. This aspect of the digital signal processor system is further detailed in U.S. Pat. No. 6,606,686 entitled UNIFIED MEMORY SYSTEM ARCHITECTURE INCLUDING CACHE AND ADDRESSABLE STATIC RANDOM ACCESS MEMORY. In accordance with the invention described in this patent some or all of level two unified cache 130 may be configured as normal read/write memory which operates under program control. If some of level two unified cache 130 is configured as SRAM, then this memory space may be either a source or a destination of a direct memory access. This will be more fully described below.

The complex interrelation of parts of digital signal processor system 100 permits numerous data movements. These are illustrated schematically in FIG. 1 and will be listed here. First, level one instruction cache 121 may receive instructions recalled from level two unified cache 130 (1) for a cache miss fill. In this example, there is no hardware support for self-modifying code so that instructions stored in level one instruction cache 121 are not altered. There are two possible data movements between level one data cache 123 and level two unified cache 130. The first of these data movements is a cache miss fill from level two unified cache 130 to level one data cache 123 (2). Data may also pass from level one data cache 123 to level two unified cache 130 (3). This data movement takes place upon: a write miss to level one data cache 123 which must be serviced by level two unified cache 130; a victim eviction from level one data cache 123 to level two unified cache 130; and a snoop response from level one data cache 123 to level two unified cache 130. Data can be moved between level two unified cache 130 and external memory 160. This can take place upon: a cache miss to level two unified cache 130 service from external memory (4) or a direct memory access 150 data movement from external memory 161 and level two unified cache 130 config-ured as SRAM; a victim eviction from level two unified cache 130 to external memory 161 (5) or a direct memory access 150 data movement from a portion of level two unified cache 130 configured as SRAM to external memory 161. Finally, data can move between level two unified cache 130 and peripherals 169. These movements take place upon: a direct memory access 150 data movement from peripheral 169 and level two unified cache 130 configured as SEAM; or a direct memory access 150 data movement from a portion of level two unified cache 130 configured as SEAM to peripherals 169. All data movement between level two unified cache 130 and external memory 161 and between level two unified cache 130 and peripherals 169 employ data transfer bus 143 and are, controlled by direct memory access unit 150. These direct memory access data movements may take place as result of a command from central processing unit core 110 or a command from another digital signal processor system received via transfer request bus 141.

The number and variety of possible data movements within digital signal processor system 100 makes the problem of maintaining coherence difficult. In any cache system data coherence is a problem. The cache system must control data accesses so that each returns the most recent data. As an example, in a single level cache a read following a write to the same memory address maintained within the cache must return the newly written data. This coherence must be maintained regardless of the processes within the cache. This coherence preserves the transparency of the cache system. That is, the programmer need not be concerned about the data movements within the cache and can program without regard to the presence or absence of the cache system. This transparency feature is important if the data processor is to properly execute programs written for members of a data processor family having no cache or varying amounts of cache. The cache hardware must maintain the programmer illusion of a single memory space. An example of an ordering hazard is a read from a cache line just victimized and being evicted from the cache. Another example in a non-write allocate cache is a read from a cache line following a write miss to that address with the newly written data in a write buffer waiting write to main memory. The cache system must include hardware to detect and handle such special cases.

A cache system including a second level cache, such as that described above in conjunction with FIG. 1, introduces additional hazards. Coherence must be maintained between the levels of cache no matter where the most recently written data is located. Generally level one caches accessing data will have the most recent data while the level two cache may have old data. If an access is made to the level two cache the cache system must determine if a more recent copy of the data is stored in a level one cache. This generally triggers a snoop cycle in which the level two cache polls the level one cache for more recent data before responding to the access. A snoop is nearly like a normal access to the snooped cache except that snoops are generally given higher priority. Snoops are granted higher priority because another level cache is stalled waiting on the response to the snoop. If the data stored in the lower level cache has been modified since the last write to the higher level cache, then this data is supplied to the higher level cache. This is referred to as a snoop hit. If the data stored in the lower level cache is clean and thus not been changed since the last write to the higher level cache, then this is noted in the snoop response but no data moves. In this case the higher level cache stores a valid copy of the data and can supply this data.

Additional hazards with a two level cache include snoops to a lower level cache where the corresponding data is a victim being evicted, snoops to data in during a write miss in the lower level cache for non-write allocation systems which places the data in a write buffer. Level two unified cache 130 may need to evict a cache entry which is also cached within level one instruction cache 121 or level one data cache 123. A snoop cycle is required to ensure the latest data is written out to the external main memory. A write snoop cycle is transmitted to both level one instruction cache 121 and level one data cache 123. This write snoop cycle misses if this data is not cached within the level one caches. Level one data cache 123 reports the snoop miss to level two unified cache 130. No cache states within level one data cache 123 are changed. Upon receipt of the snoop miss report, level two unified cache 130 knows that it holds the only copy of the data and operates accordingly. If the snoop cycle hits a cache entry within level one data cache 123, the response differs depending on the cache state of the corresponding cache entry. If the cache entry is not in a modified state, then level two unified cache 130 has a current copy of the data and can operate accordingly. The cache entry is invalidated within level one data cache 123. It is impractical to maintain cache coherency if level one data cache 123 caches the data and level two unified cache 130 does not. Thus the copy of the data evicted from level two unified cache 130 is no longer cached within level one data cache 123. If the cache entry in level one data cache 123 is in the modified state 303 and thus had been modified within that cache, then the snoop response includes a copy of the data. Level two unified cache 130 must merge the data modified in level one data cache 123 with data cached within it before eviction to external memory. The cache entry within level one data cache 123 is invalidated.

In a similar fashion snoop cycles are sent to level one instruction cache 121. Since the digital signal processing system 100 cannot modify instructions within level one instruction cache 121, no snoop return is needed. Upon a snoop miss nothing changes within level one instruction cache 121. If there is a snoop hit within level one instruction cache 121, then the corresponding cache entry is invalidated. A later attempt to fetch the instructions at that address will generate a cache miss within level one instruction cache 121. This cache miss will be serviced from level two unified cache 130.

Figure 2:
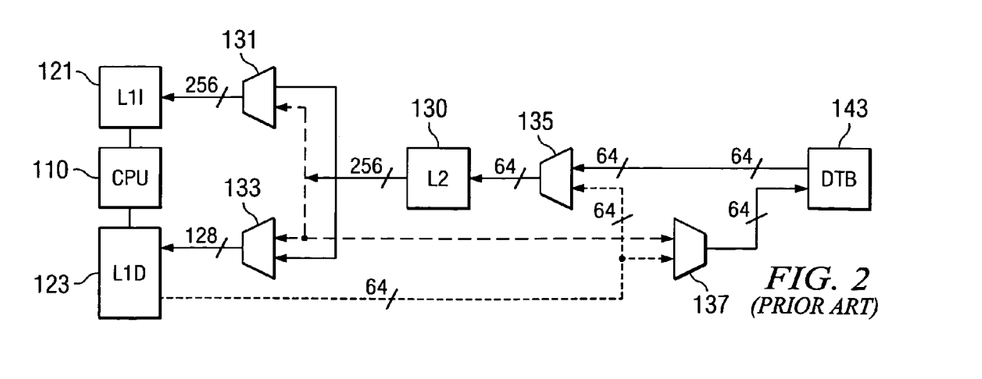
FIG. 2 illustrates the data paths to and from the level two unified cache illustrated in FIG. 1.

FIG. 2 illustrates the data connections among parts of digital signal processing system 100 illustrated in FIG. 1. FIG. 2 illustrates the data path widths between the various parts. The level one instruction cache interface includes a 256-bit data path from level two unified cache 130 to level one instruction cache 121. This data path size corresponds to one half of the 64 byte cache line size within level one instruction cache 121 and equals one instruction fetch packet. In the preferred embodiment, the 256-bits are 64 bits from each of the four banks of level two unified cache 130. Thus level two unified cache 130 can source this amount of data in a single cycle. This occurs regardless of the amount of level two unified cache 130 configured as cache. The cache/SRAM partitioning within level two unified cache 130 is across the data banks rather than within the data banks. Thus level two unified cache 130 can always supply 256 bits to level one instruction cache 121 if any part is partitioned as cache. Level one instruction cache 121 may also receive data directly from data transfer bus 143, for example upon fetching code from non-cacheable memory addresses. Data transfer bus 143 supplies only 64 bits per cycle, thus at least four cycles are needed to accumulate the 256 bits. The data source for transfers to level one instruction cache 121 is selected by multiplexer 131. FIG. 1 illustrates supply of 32 address bits from level one instruction cache 121 to level two unified cache 130. Because level one instruction cache 121 operates on 256 bit boundaries, the 8 least significant bits are always zero and may be omitted from the address. Note that writes to level one instruction cache 121 are not permitted, therefore level one instruction cache 121 never supplies data to level two unified cache 130.

The level one data cache interface includes a 128-bit data path from level two unified cache 130 to level one data cache 123. In the preferred embodiment, the 128 bits are 64 bits from each of two banks of level two unified cache 130. This assumes no bank conflicts with other data transfers. Level two unified cache 130 only services one cache fill data transfer to level one data cache 123 per cycle. Thus if two load/store units in central processing unit 110 each request data and produce a read cache miss within level one data cache 123, the two read miss requests to level two unified cache 130 are serviced in sequence. As noted above, the cache/SRAM partitioning of level two unified cache 130 is across the memory banks. Thus level two unified cache 130 can supply data to level one data cache 123 from two banks so long as level two unified cache 130 is partitioned to include some cache. Level one data cache 123 may also receive data directly from data transfer bus 143, for example upon fetching data from non-cacheable memory addresses. Data transfer bus 143 supplies only 64 bits per cycle, however accesses to non-cacheable memory addresses are at most 32 bits. In this case, the 32 bits are transferred in a single data transfer cycle. The data source for transfers to level one data cache 123 is selected by multiplexer 133. FIG. 1 illustrates supply of two sets of 32 address bits from level one data cache 123 to level two unified cache 130. Because level one data cache 123 operates on 64 bit boundaries, the 6 least significant bits are always zero and may be omitted from the address.

Level one data cache 123 may supply data to level two unified cache 130. This occurs on a write miss, a cache entry eviction and a response to a snoop hit to data in the modified state within level one data cache 123. It is possible that each of the load/store units within central processing unit 110 would require data transfer from level one data cache 123 to level two unified cache 130 in the same cycle. Upon a write miss within level one data cache 123, only the 32 bits of the write data is supplied from level one data cache 123 to level 2 unified cache 130. For either a cache eviction or a snoop data response, level one data cache 121 supplies 128 bits to level two unified cache 130, the same data width as opposite transfers. Data from level one data cache 123 may also be supplied to data transfer bus 143 as selected by multiplexer 137. This could occur as a result of a write to a non-cacheable address.

The interface between level two unified cache 130 and data transfer bus 143 includes two 64-bit data busses. A first of these data busses supplies data from data transfer bus 143 to level two unified cache 130. This data may be stored in level two unified cache 130 via a single 64-bit write port as selected by multiplexer 135. The second bus is a 64-bit bus supplying data from level two unified cache 130 or level one data cache 123 as selected by multiplexer 137. All transfers using data transfer bus 143 employ direct memory access unit 150 responsive to commands via transfer request bus 141.

Figures 3, 4:
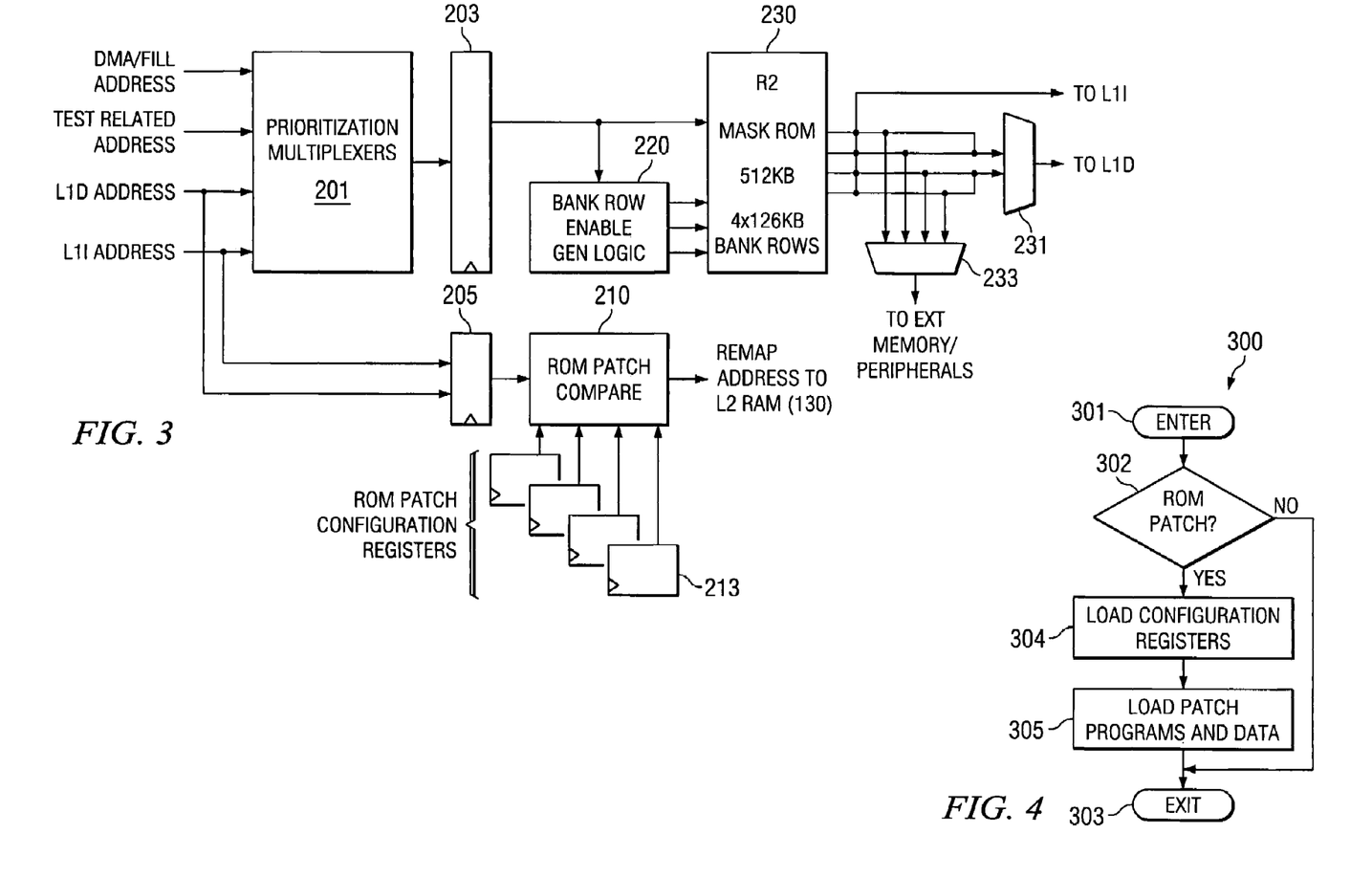
FIG. 3 illustrates the circuits of one embodiment of this invention.
FIG. 4 illustrates the steps in initial set-up of ROM patching.

FIG. 3 illustrates the components of one embodiment of this invention. The components of FIG. 3 are a part of level two unified cache 130. Other parts not shown are the RAM array which can be configured between directly addressable RAM and cache. Prioritization multiplexers 201 receive access requests to level two unified cache 130. These access requests include DMA reads, reads for cache fill data for level two unified cache 130 cache misses, test related addresses and cache service requests triggered by cache misses from level one instruction cache 121 and level one data cache 123. Prioritization multiplexers 201 selects only one address to supply to level two mask ROM 230. This selected address is temporarily stored in latch 203.

Bank row enable logic generator 220 operates in conjunction with the organization of level two mask ROM 230 to supply the requested data. Level two mask ROM 230 preferably includes four banks of by 64-bit memory. Level two mask ROM 230 can supply 256 bits, 128 bits or 64 bits as selected by bank row enable generator 220 depending on the destination of this data. As previously disclosed above in conjunction with FIG. 2, level one instruction cache 121 receives 256 bits at a time. If the data read from level two mask ROM 230 is destined for level one instruction cache, then bank row enable generator 220 enables all four banks and all 265 bits are supplied to level one instruction cache 121. If the data read from level two mask ROM 230 is destined for level one data cache 123, then bank row enable generator 220 enables either the upper two banks or the lower two banks based upon the requested address. Multiplexer 231 selects the 128 bits recalled, from the selected pair of banks for supply to level one data cache 123. If the data read from level two mask ROM 230 is destined for external memory or a peripheral, then bank row enable generator 220. enables only one of the four banks depending on the address. Multiplexer 233 selects the 64 bits recalled from the selected bank for supply to data transfer bus 143. Data transfer bus 143 routes this data to its desired destination.

Any miss addresses from level one instruction cache 121 or level one data cache 123 are routed to latch 205. ROM patch address comparator 210 compares the address latched in latch 205 with each of the ROM patch configuration registers 213. There could be one or more ROM patch configuration registers 213, but preferably there are plural. ROM patch configuration registers 213 store remapping source and target addresses. For implementations that support variable size patching, each instance of ROM patch configuration registers 213 also stores the size of the block to be patched. Multiple instances of ROM patch configuration registers 213 are implemented, one for each address block to be patched. The preferred embodiment uses a fixed size block and 4 sets of ROM patch configuration registers 213 enabling patches for up to four blocks.

ROM patch address comparator 210 may include split address decoders for fixed block size implementations and address value or range comparators for variable block size implementations. ROM patch address comparator 210 enables the remapping of the access target address on a cycle by cycle basis by comparing the contents of target address and range registers within ROM patch configuration registers 213 with the CPU generated address stored in latch 205.

There are two methods for loading data into ROM patch configuration registers 213. These registers can be loaded using a configuration bus such as disclosed in U.S. patent application Ser. No. 09/638,512 filed Aug. 11, 2000 entitled CONFIGURATION BUS RECONFIGURABLE/REPROGRAMMABLE INTERFACE FOR EXPANDED DIRECT MEMORY ACCESS PROCESSOR, which claims priority from U.S. Provisional Application No. 60/153,391 filed Sep. 10, 1999. Alternatively, address decoders could enable the memory mapping of the configuration registers into an appropriate region of central processing unit 110 address space.

ROM patch address comparator 210 takes no action if it detects no match. If ROM patch address comparator 210 detects a match, it generates a translated address according to the hit ROM patch configuration registers 213 for supply to level two unified cache 130. This translated address is preferably within the part of level two unified cache 130 configured as directly addressable memory. This translated address may also lie within a cache-portion of the address space of external memory 161. This would permit the patch to reside in external memory 161 and be cached within a cache configured portion of level two unified cache 130.

A multi-level memory such as illustrated in FIG. 1, isolates the remapping hardware from the CPU memory interface. Thus the CPU cycle time is not affected by the speed of the patch mechanism. The patch mechanism would still need to meet the timing requirements of access from the level one instruction cache 121 or level one data cache 123 to level two unified cache 130.

FIG. 4 illustrates the procedure 300 for initial set-up for ROM patching. These steps are preferably implemented as part of the start-up or initial boot sequence of central processing unit 110. Procedure 300 begins via enter block 301. Procedure 300 tests to determine if a ROM patch has been enabled (decision block 302). This is preferably signaled by the device configuration detected upon start-up. If no ROM patch is enabled (No at decision block 302), procedure 360 ends via exit block 303.

If a ROM patch is enabled (Yes at decision block 302), then procedure 300 loads ROM patch configuration registers 213 (processing block 304). This enables patch detection and address translation as previously described. The data loaded into ROM patch configuration registers 213 is stored in some system non-volatile memory separate from the chip embodying the central processing unit and the program ROM. Procedure 300 then loads the patch program or data into an on-chip volatile memory (processing block 305). This on-chip volatile memory is preferably a directly addressable memory portion of level two unified cache 130 as described above. This data is also preferably recalled from a system non-volatile memory. Procedure 300 then ends via exit block 303.

Figures 5, 6:
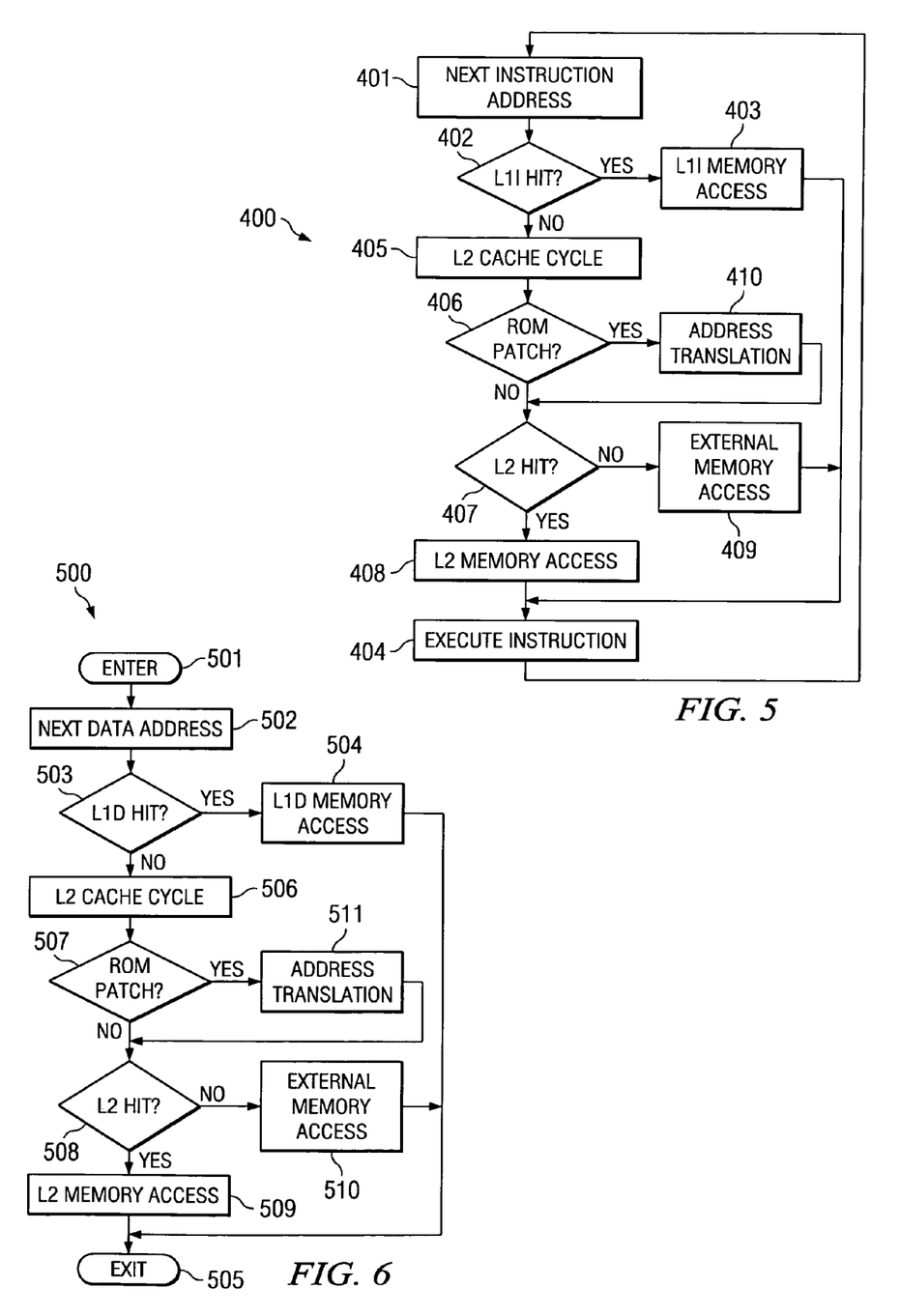
FIG. 5 illustrates the steps in patching ROM instructions.
FIG. 6 illustrates the steps in patching ROM data.

FIG. 5 illustrates procedure 400 for instruction patching. Central processing unit 110 computes the next instruction address (processing block 401). This may be the next sequential address or the result of a branch. Central processing unit 110 generates an instruction fetch at that next instruction address to level one instruction cache 121. Level one instruction cache 121 determines whether it stores the instruction at this address (decision block 402). When level one instruction cache 121 stores the instruction for this address, it is called an L1I cache hit. If level one instruction cache 121 stores the instruction at this address (L1I cache hit, Yes at decision block 402), this instruction is supplied to central processing unit 110 (processing block 403) from level one instruction cache 121. Central processing unit 110 executes this instruction (processing block 404) and then returns to processing block 401 to calculate the next instruction address.

If level one instruction cache 121 does not store the instruction at this address (L1I cache miss, No at decision block 402), it generates a level two unified cache access (processing block 405). Next procedure 300 checks to determine if the instruction address is patched (decision block 406). This test takes place in ROM patch address comparator 210 in conjunction with ROM patch configuration registers 213 as described above. If this address is not patched (No at decision block 406), then level two unified cache 130 checks to determine if it stores the instruction at this address (decision block 407). When level two unified cache 130 stores the instruction for this address, it is called an L2 cache hit. According to the preferred embodiment, this instruction could be stored within level two mask ROM 230, the directly addressable memory portion of level two unified cache 130 or cached in the cache portion of level two unified cache 130. If the instruction stored at this address is found within level two unified cache 130 (L2 hit, Yes at decision block 407), then this instruction is fetched and supplied to central processing unit 110 (processing block 408) and preferably also supplied to level one instruction cache 121 for caching. If the instruction stored at this address is not found within level two unified cache 130 (L2 miss, No at decision block 407), then this instruction is fetched from external memory 161 and supplied to central processing unit 110 (processing block 409). If this is a cacheable address, then both level one instruction cache 121 and level two unified cache 130 cache this instruction for later use. In either case, control passes to processing block 404 where the instruction is executed.

If this address is patched (Yes at decision block 406), then ROM patch address comparator 210 does an address translation (processing block 410). This address translation is described above. Procedure 400 then goes to decision block 407 to check if the translated address is within level two unified cache 130. As described above, this translated address is preferably within the directly addressable memory portion of level two unified cache 130. This translated address could also be a cacheable address. In this case, the instruction may be stored within the cache portion of level two unified cache 130 or may be only stored in external memory 161. Instruction fetches from these sources have been previously described. This translated address could be a non-cacheable address. In this event, the instruction is only stored in external memory 161. If the instruction is stored within level two unified cache 130 (L2 hit, Yes at decision block 407), the instruction at the translated address is fetched (processing block 408). If the instruction is not stored within level two unified cache 130 (L2 miss, No at decision block 407), then the instruction is fetched from external memory 161 (processing block 409). In any event, control passes to processing block 404 where the instruction is executed.

FIG. 6 illustrates a similar procedure 500 for data patching. Procedure 500 is begun via enter block 501. Central processing unit 110 computes the next data address (processing block 502). Central processing unit 110 generates a data fetch at that next data address to level one data cache 123. Level one data cache 123 determines whether it stores this address (decision block 503). If level one data cache 123 stores this address (L1D cache hit, Yes at decision block 503), this data is supplied to central processing unit 110 (processing block 504). Procedure 500 ends via exit block 505.

If level one data cache 123 does not store the data at this address (L1D cache miss, No at decision block 503), it generates a level two unified cache access (processing block 506). Next procedure 500 checks to determine if the data address is patched (decision block 507). This test takes place in ROM patch address comparator 210 in conjunction with ROM patch configuration registers 213 as described above. If this address is not patched (No at decision block 507), then level two unified cache 130 checks to determine if it stores the data at this address (decision block 508). According to the preferred embodiment, this data could be stored within level two mask ROM 230, the directly addressable memory portion of level two unified cache 130 or cached in the cache portion of level two unified cache 130. If the data stored at this address is found within level two unified cache 130 (L2 hit, Yes at decision block 508), then this data is fetched and supplied to central processing unit 110 (processing block 509) and preferably also supplied to level one data cache 123 for caching. If the data stored at this address is not found within level two unified cache 130 (L2 miss, No at decision block 508), then this data is fetched from external memory 161 and supplied to central processing unit 110 (processing block 510). If this is a cacheable address, this data is preferably also cached in level one data cache 123 and level two unified cache 130. In either case, procedure 500 ends via exit block 505.

If this address is patched (Yes at decision block 507), then ROM patch address comparator 210 does an address translation (processing block 511). This address translation is described above. Procedure 500 then returns to decision block 508 and proceeds as previously described. As described above, this translated address is preferably within the directly addressable memory portion of level two unified cache 130. Procedure 500 ends via exit block 505.

What is claimed is:

1. A memory system for storing data to be used by a central processing unit, comprising:
a cache memory for caching data, said cache memory responsive to a fetch address for supplying data corresponding to said fetch address if data for said fetch address is stored within and generating a cache miss response if data for said fetch address is not stored within;
a read only memory for storing data at a predetermined set of addresses within an address space;
a patch address comparator connected to said cache memory and said read only memory, said patch address comparator including
at least one writable comparison address register storing an alterable comparison address,
a comparator connected to each comparison address register and receiving said fetch address, said comparator determining if said fetch address matches said comparison address of any comparison address register, and
an address translator corresponding to each comparison address register for translating a fetch address into a translated address within said address space when said comparator determines said fetch address matches a corresponding comparison address; and
circuitry, operable independent of and without interrupting said central processing unit, for supplying said translated address to a memory.

2. The memory system of claim 1, wherein:
said cache memory consists of an instruction cache memory caching instructions for said central processing unit;

said read only memory stores instructions for said central processing unit;
said patch address comparator wherein
    said at least one writable comparison address register stores an address of an instruction to be patched, and
    each address translator translates said fetch address into a translated address storing a patch instruction corresponding to said instruction to be patched.

3. The memory system of claim 1, wherein:
said cache memory consists of a data cache memory caching data for central processing said unit;
said read only memory stores data for said central processing unit;
said patch address comparator wherein
    said at least one writable comparison address register stores an address of data to be patched, and
    each address translator translates said fetch address into a translated address storing patch data corresponding to said data to be patched.

4. The memory system of claim 1, wherein:
each writable comparison address register is a memory mapped register writable by writing to a corresponding memory address.

5. The memory system of claim 1, further comprising:
a second level cache memory connected to said cache memory and said patch address comparator, said second level cache memory for caching data, said second level cache memory
    responsive to a cache miss address from said cache memory for supplying data corresponding to said cache miss address if data for said cache miss address is stored within and generating a cache miss response to an external memory including supply of said cache miss address if data for said cache miss address is not stored within,
    responsive to a translated address from said patch address comparator for supplying data corresponding to said translated address if data for said translated address is stored within and generating a cache miss response to an external memory including supply of said translated address if data for said translated address is not stored within.

6. The memory system of claim 1, further comprising:
a second level cache memory connected to said cache memory and said patch address comparator, said second level cache memory including a first directly addressable portion capable of writing to and reading from a predetermined address range and a second portion for caching data, said second level cache memory
    responsive to a cache miss address from said cache memory within said predetermined address range of said first directly addressable portion for granting memory access at said cache miss address,
    responsive to a translated address from said patch address comparator within said predetermined address range of said first portion for granting memory access at said translated address,
    responsive to a cache miss address from said cache memory outside said predetermined address range of said first directly addressable portion for supplying data corresponding to said cache miss address if data for said cache miss address is stored within said second portion and generating a cache miss response to an external memory including supply of said cache miss address if data for said cache miss address is not stored within said second portion, and
    responsive to a translated address from said patch address comparator outside said predetermined address range of said first directly addressable portion for supplying data corresponding to said translated address if data for said translated address is stored within said second portion and generating a cache miss response to an external memory including supply of said translated address if data for said translated address is not stored within said second portion.

7. The memory system of claim 6, wherein:
at least one address translator generates a translated address within said predetermined address range of said first directly addressable portion.

8. A memory system comprising:
a read only memory for storing data at a predetermined set of addresses within an address space;
a first cache memory for caching data, said first cache memory responsive to a fetch address input to said first cache memory for supplying data corresponding to said fetch address input to said first cache memory if data for said fetch address input to said first cache memory is stored within and generating a cache miss response if data for said fetch address input to said first cache memory is not stored within;
a second cache memory for caching data, said second cache memory responsive to said cache miss and a fetch address input to said second cache memory for supplying data corresponding to said fetch address input to said second cache memory if data for said fetch address input to said second cache memory is stored within and generating a cache miss response if data for said fetch address input to said second cache memory is not stored within; and
a patch address comparator connected to said second cache memory and said read only memory, said patch address comparator including
    at least one writable comparison address register storing an alterable comparison address,
    a comparator connected to each comparison address register and for receiving a fetch address for inputting to said second cache memory only in response to a cache miss response from the first cache memory, said comparator determining if said fetch address for inputting to said second cache memory matches said comparison address of any comparison address register, and
    an address translator corresponding to each comparison address register for translating said fetch address for inputting to said second cache memory into a translated address within said address space when said comparator determines said fetch address for inputting to said second memory matches a corresponding comparison address, wherein the translated address is provided as said fetch address input to said second cache memory.

9. A processor system, comprising:
a central processing unit core;
a read only memory for storing data at a predetermined set of addresses within an address space;
a cache memory for caching data, said cache memory responsive to a fetch address input to said cache memory for supplying data corresponding to said fetch address if data for said fetch address is stored within and generating a cache miss response if data for said fetch address is not stored within; and a patch address comparator connected to said cache memory and said read only memory, said patch address comparator including
    at least one writable comparison address register storing an alterable comparison address,
    a comparator connected to each comparison address register and receiving said fetch address, said comparator determining if said fetch address matches said comparison address of any comparison address register, and
    an address translator corresponding to each comparison address register for translating said fetch address into a translated address within said address space when said comparator determines said fetch address matches a corresponding comparison address, wherein said translated address is for supply to an additional cache memory; and
circuitry, operable independent of and without interrupting said central processing unit core, for supplying said translated address to a memory.

* * * * *